United States Patent Office 3,345,859
Patented Oct. 10, 1967

3,345,859
CHROMATOGRAPHIC ANALYSIS WITH AUTOMATIC BASELINE COMPENSATION
Ellsworth R. Fenske, Palatine, Ill., assignor to Universal Oil Products Company, Des Plaines, Ill., a corporation of Delaware
Filed Jan. 28, 1964, Ser. No. 340,641
20 Claims. (Cl. 73—23.1)

ABSTRACT OF THE DISCLOSURE

An automatic baseline compensation system for a vapor phase chromatograph utilizing a selective sorbent column in which the column is presaturated with a selectively sorbed component of the sample. The column effluent is passed successively through a measuring cell, a delay column and a reference cell, in that order. The difference between the electrical outputs of the measuring and reference cells provides a signal in which the contributions due to continuously eluted selectively sorbed component mutually cancel out, leaving only a peak or train of peaks, corresponding to the non-sorbed component(s) of the sample, superimposed on a stable baseline.

---

This invention relates to a method and apparatus for analyzing mixtures of fluid components and more particularly to the analysis of such mixtures by an improved vapor phase chromatography technique utilizing as the component separating medium a solid sorbent capable of retaining one or more components of the mixture and rejecting one or more other components thereof. More specifically the present invention is directed to a method and apparatus for the rapid analysis of a single broad class of components present in a sample mixture: those components which are relatively less sorbed or rejected by the sorbent, as distinguished from those components which are selectively sorbed by the sorbent. The invention further embodies a novel flow arrangement whereby the potential analyzer response arising from selectively sorbed components is suppressed to provide continuous automatic baseline compensation.

The theory and application of vapor phase chromatography is well known. Much of the work in this art has been directed to the development of high resolution apparatus capable of separating and quantitatively measuring very closely related compounds in a complex multicomponent system. Many sophisticated column designs have been developed which are capable of handling sample volumes in the microliter or even nanoliter range; other designs embody elaborate flow schemes, multiple columns, novel column packing materials, ultra-sensitive detectors, advanced electronic circuitry, and the like, all with the objective of providing even higher resolution and sensitivity. For the most part such complicated analytical equipment can be utilized to advantage only in the laboratory by or under the supervision of a skilled technician. Equipment of this type has generally proven unsatisfactory, when transferred to the chemical plant or petroleum refinery and utilized as a process stream analyzer, because it lacks reliability under adverse environment and needs considerable maintenance and calibration. Even the highly engineered process stream chromatographs heretofore available for use in field installations do not provide the complete answer and in fact have at least three substantial drawbacks: first, conventional chromatographs have excessive capability, by which is meant they supply a more thorough analysis of a multicomponent stream than is needed by a plant operator who is usually interested in only one key component or group of components. Second, they require a relatively long time to elute a given sample, hence the interval between analyses is often unduly delayed which cannot be shortened even though the peaks not of interest are mechanically or electronically suppressed. Third, where it is desired to determine the percentage of A in a mixture of components A, B and C, it is necessary to compute by integration the area under each of the peaks corresponding to components A, B and C, sum the integrations, and divide the area for A by the resulting sum; this is a tedious and time consuming task when done manually, necessitates elaborate and expensive computing circuitry when done electronically, and in any case the frequency of the determinations remains limited by sample elution time.

The present invention largely eliminates the aforesaid disadvantages of prior art chromatographic analyzers through the use of a solid sorbent as the chromatographic packing material in combination with a unique reference signal generation means. Various solid sorbents of specific composition and structure are known which, upon contact with a mixture of components which differ in their relative sorbency on the solid, have the ability to selectively sorb one or more components thereof and to pass or reject one or more other components, thereby providing a means for segregating the individual components according to their structure. The physical or chemical mechanisms by which particular sorbents are operative for particular multi-component mixtures may differ. For example, typical sorbents operative by reason of their adsorptive properties include silica gel, activated charcoal, aluminosilicates such as the various clays and activated silica gels including, for example, Attapulgus clay, montmorillonite, dehydrated composites of alumina and silica activated by heating to a temperature slightly below the fusion point of the composite, and activated alumina; sorbents operative by molecular occlusion are the dehydrated metal aluminosilicate hydrates wherein the metal constituent is an alkali or alkaline earth metal, commonly referred to as "molecular sieves." These and other types of sorbents, as well as processes employing them, are well known in the art, and are more completely described, for example, in U.S. Patent 2,985,589. Any of the above sorbents may be employed in the present invention.

Solid sorbents of the class described are characterized by having a given capacity with respect to a given selectively sorbed component or a group of components, usually expressed as the weight or volume ratio of sorbate to sorbent. The capacity is also dependent on pressure, temperature and occasionally on space velocity and/or concentration of selectively sorbed material in the feed stock. In any event for a specified system the point at which the capacity of the sorbent is exceeded, by reason of sorbent saturation, is readily recognized by a substantial increase in the concentration of selectively sorbed material appearing in the effluent from the separating zone. Commercial separation and purification processes employing solid sorbents must include a desorption or stripping operation, upon or before attaining substantial saturation of the sorbent, to regenerate the sorbent for reuse and to avoid off-specification product. However, as will be shown below, it is neither necessary nor desirable for the purposes of the present invention that the sorbent be regenerated, and in fact repetitive analyses may be performed indefinitely, long after the sorbent has become saturated with selectively sorbed material.

Operation of the invention is based in part on unusual and unexpected chromatographic action of solid sorbents, which is best described by first considering the response of a chromatographic analyzer which is conventional in all respects except that the separating column is filled with a solid sorbent capable of selectively sorbing at least one component of an analysis mixture, and rejecting at least one other component thereof. Such analyzer includes a means for passing a continuous flow of carrier gas, such as helium, first through a reference thermal conductivity cell, then successively through the separating column and a measuring thermal conductivity cell; the apparatus also includes a sample injection means for injecting controlled volumn samples of the fluid mixture to be analyzed directly into the carrier gas stream between the reference cell and the separating column. The reference cell and measuring cell are connected in a suitable bridge circuit which drives a potentiometric recorder. Consider first that the column is filled with fresh or only partially saturated sorbent, carrier gas flow is established at the proper rate, column temperature is stabilized at the proper level, and the measuring bridge circuit parameters are adjusted to provide an electrical zero output in the recorder. Assume that the fluid mixture to be analyzed is a binary mixture consisting of one selectively sorbed component and one relatively less sorbed component. A first sample is injected and a short while later a peak is recorded corresponding to passage of the less sorbed component through the measuring cell; the recorder pen returns to zero and remains there since the selectively sorbed component originally present in the sample is captured by the sorbent and is not stripped or desorbed by the carrier gas. The same response will be obtained after each of a number of successive sample injections until the sorbent becomes saturated with respect to the selectively sorbed component. When saturation occurs the selectively sorbed component begins to elute at a uniform rate from the separating column, even through another sample has not yet been injected, and the recorder pen will suddenly drive upscale a substantial distance above electrical zero corresponding to passage of the selectively sorbed component through the measuring cell. This response is not a "peak" but is a stable "baseline" elevated above electrical zero which persists for a substantial period of time following the last previous sample injection, and the magnitude of such elevation has been found to be proportional to the amount by weight of selectively sorbed component present in the sample. If, the now, successive samples of the fluid mixture are injected periodically, and the concentration of selectively sorbed component in each is different, the analyzer output will take the form of a peak, soon after each sample injection (due to the less sorbed component) superimposed on a continuous time-varying elevated "baseline," the latter accurately tracking the varying content of the selectively sorbed component in the series of samples. The height of the peak due to less sorbed component above this elevated baseline is proportional to the weight concentration of less sorbed component in the analysis mixture, and the deflection above electrical zero after passage of the less sorbed component peak is proportional to the weight concentration of the selectively sorbed component in the anaylsis mixture. In other words, the less sorbed component peak adds linearily to this elevated baseline signal. The apparatus so far described provides a means for analyzing either selectively sorbed component or less sorbed component, or both, and indeed is highly valuable for this purpose, particularly since it develops a continuous output signal corresponding to selectively sorbed component, notwithstanding intermittent sample injection. However, where it is desired to analyze for less sorbed component, the concentration thereof beinging proportional to the deviation of the less sorbed component peak above the elevated baseline which itself varies in response to the selectively sorbed component content of the sample stream, the height of the less sorbed component peak above chart zero is not necessarily a correct measure of the less sorbed component concentration. Also, where the analysis mixture contains only a small proportion of less sorbed component, the less sorbed component signal will be so small in relation to full scale recorder deflection that sensitivity and accuracy are poor.

The present invention embodies a novel variation of the flow scheme of the above described chromatographic analyzer whereby the elevated baseline signal, developed by continuous post-saturation elution of selectively sorbed component, is automatically suppressed. This allows a direct analysis for less sorbed component because absolute deviation of its peak above chart zero or other fixed reference point is now proportional to concentration thereof in the sample. Even where the analysis mixture contains only a small proportion of less sorbed component, high sensitivity and accuracy are readily obtained because the only net signal input to the recorder is that corresponding to the less sorbed component peak, which may be suitably amplified without interference by the relatively large baseline signal.

In accordance with this invention there is provided a means for passing a continuous flow of carier gas first through a separating column, then successively through a measuring cell, a delay line or column, and finally through a reference cell. A sample injection means is provided for injecting controlled volume samples of the fluid mixture to be analyzed into the carrier gas stream immediately upstream from the separating column. The reference cell and measuring cell are incorporated in a suitable bridge circuit which drives a potentiometric recorder. The separating column is packed with a solid sorbent capable of selectively sorbing one or more, but less than all, of the components present in the sample. The analyzer of this invention is operative under either of two conditions: (1) before saturation of the sorbent with selectively sorbed material, and (2) after saturation of the sorbent with selectively sorbed material. With respect to operation before saturation, and assuming that the fluid mixture to be analyzed is a binary mixture consisting of one selectively sorbed component and one relatively less sorbed component, consider first that the separating column is filled with fresh sorbent, carrier gas flow is established at the proper rate, column temperature is stabilized at the proper level, and the measuring bridge circuit parameters are adjusted to provide an electrical zero output in the recorder which is elevated some distance above chart zero. Initially only pure carrier gas flows through the measuring cell and the reference cell, and the measuring and reference signals developed thereby are equal in magnitude, but opposite in polarity since they are caused to be mutually opposing by the bridge circuit, and so the recorder pen remains at electrical zero. A first sample is injected, the less sorbed material is rapidly eluted from the column as a compact band, and two peaks are recorded corresponding to passage of the less sorbed component first through the measuring cell and then through the reference cell; the first peak is of positive polarity and the second peak is of negative polarity, both are of equal magnitude, and they are displaced in time by an interval equivalent to the time of fluid transport through the delay column connecting the measuring cell to the reference cell. The function of the delay column is to prevent any substantial overlapping or interference between the measuring signal developed by less sorbed component and the reference signal developed by less sorbed component. During the period that the measuring cell sees a mixture of carrier gas and less sorbed component, the reference cell sees only carrier gas and the recorder output is therefore positive with respect to electrical zero; a short while later and during the period that the reference cell sees a mixture of carrier gas and less sorbed component, the measuring cell sees only carrier gas and the recorder output is therefore negative with respect to electrical zero. The area embraced by either peak, or maximum deviation of either peak from electrical zero in the case of symmetrical peaks (which most frequently obtain) is proportional to the concentration by weight of less sorbed component in the sampled mixture. Following passage of the two peaks, the recorder pen turns to electrical zero and remains there since the selectively sorbed component originally present in the sample is captured by the sorbent and is not stripped or desorbed by the carrier gas. After a number of successive sample injections the solid sorbent will become saturated with respect to the selectively sorbed component. When saturation occurs the selectively sorbed component begins to elute at a uniform rate from the separating column, and such uniform elution continues for a substantial period of time following the last previous sample injection. The measuring cell now sees a stream comprising a mixture of carrier gas and selectively sorbed component and develops a continuous signal proportional to the weight concentration of selectively sorbed component in the sample. Similarly the reference cell sees the same stream and develops a continuous signal of equal magnitude but of opposite polarity. The continuous measuring and reference signals are canceled out by the bridge circuit and so the recorder pen remains at electrical zero. Whereas the reference gas before saturation is pure carrier gas, the reference gas after saturation is a mixture of carrier gas with selectively sorbed component. The composition of the carrier gas after saturation will not, in general, remain constant but will vary in response to whatever charges may ocur in the concentration of selectively sorbed component in each of a series of successive samples. However this presents no problem because the base-line signal generated by the measuring cell is always canceled by an opposite polarity baseline signal of equal magnitude generated by the reference cell.

So far as the apparatus of the present invention is concerned, it is of no consequence to its operability whether or not the solid sorbent is saturated with selectively sorbed material. But once saturation is reached, it is essential to pass the same material, e.g., separating column effluent, serially through both the measuring cell and the reference cell, with a time delay interposed therebetween. As indicated above, presaturation of the sorbent may be accomplished in situ, simply by charging repetitive samples containing selectively sorbed material to the separating column which is loaded with fresh or only partially saturated sorbent until substantial saturation is achieved. Presaturation may also be effected by contacting the sorbent with the selectively sorbed component or components, either in pure form or in admixture with relatively less sorbed components under sorption conditions prior to loading it into the separating column.

Consider next the case where the fluid mixture to be analyzed is a multi-component mixture consisting of two or more selectively sorbed components and one relatively less sorbed component. After a number of sample injections the sorbent becomes saturated with selectively sorbed material which, at a suitably high temperature, can be made to elute at a uniform rate and without discrimination or chromatographic separation as among the several selectively sorbed components. The analyzer output has the same form as when the fluid mixture is a binary system, that is, two equal magnitude peaks of opposite polarity, displaced in time, corresponding to passage of less sorbed component through the two cells, deviating from a constant baseline. The analyzer in effect treats the multi-component mixture as a pseudo-binary system with automatic suppression of the continuous signal developed by the continuous, non-discriminatory elution of all selectively sorbed components.

Consider further the case where the fluid mixture to be analyzed comprises at least two selectively sorbed components and at least two relatively less sorbed components. After the sorbent is saturated with selectively sorbed material, continued repetitive sample injection results in continuous, non-discriminatory elution of the several selectively sorbed components. If the temperature of the separating column is sufficiently low, chromatographic separation of the less sorbed components will nevertheless occur so that the analyzer output, following each sample injection, is a series of alternating positive and negative peaks, corresponding to the specific components contained in the less sorbed class. While this type of analysis is frequently useful and is included within the scope of the invention, it is also desirable and possible to make the analyzer respond as though the fluid mixture were binary. This is accomplished by raising the column temperature to the point where all the less sorbed components are eluted from the column almost immediately and without discrimination, while the selectively sorbed components continue to elute uniformly, also without discrimination, thereby achieving a "lumping effect." The analyzer output, following each sample injection, now takes the form of two narrow peaks or spikes of opposite polarity, displaced in time, deviating from a constant baseline. The height or area under either peak is proportional to the total less sorbed component content of the sample. When operated in this manner, e.g., to perform a pseudo-binary analysis, the analyzer distinguishes only between two broad classes of components: those which are selectively sorbed, and those which are relatively less sorbed; information respecting the former class is suppressed, leaving only a quantitative measure of the latter class. Such information is often invaluable to the plant operator who is seeking to optimize the performance of a particular piece of hardware or refinery process unit, such as a distillation column or catalytic cracker, and who is not interested in a compound-by-compound analysis of a stream. The pseudo-binary analysis has the additional advantage that elution time per sample is generally at a minimum so that higher sampling frequencies may be used. The column temperature necessary to achieve the lumping effect is dependent on several variables such as the type of sorbent, the specific compounds in the mixture to be analyzed, the carrier gas flow rate, etc., but in any event can be ascertained by routine experimentation with a particular system.

It will be recognized that the method and apparatus of this invention differs over the prior art chromatographic analyzers in at least five important respects:

(1) At least one of the components of the analysis mixture is eluted from the column continuously, notwithstanding intermittent sample injection, and at least one other component is eluted discontinuously, in contrast to conventional chromatographs wherein each specific component elutes discontinuously as a binary mixture with the carrier gas.

(2) If the analysis mixture contains two or more selectively sorbed components, these are eluted from the column continuously and without discrimination. This technique deliberately provides for a zero or negligible separation between the specific selectively sorbed components, as opposed to the philosophy of the prior art which has sought to achieve high resolution between all specific components of the analysis mixture.

(3) If the analysis mixture contains two or more less sorbed components, in a preferred embodiment of the invention these components are eluted simultaneously or substantially so, within a very short time after sample injection, and their time of passage through the measuring and reference cells is short in comparison to the interval between sample injections.

(4) The reference cell is serially connected with the measuring cell through a delay line means whereby the reference gas after sorbent saturation is a mixture of carrier gas and selectively sorbed material. The reference cell of conventional chromatographs is connected directly to the carrier gas supply.

(5) Elution time per sample is significantly less than that required by the conventional chromatographs.

Advantages of the invention include the following: a single less sorbed component develops a unitary signal proportional to its weight concentration in the analysis mixture, and a group of such components, if present in the analysis mixture, can be lumped into a single peak the height or area of which is proportional to the total weight concentration thereof, thereby eliminating the computing circuitry required for automatic component readout in high resolution work; nearly automatic baseline control is provided by passing the separating column effluent first through the measuring cell and, after a suitable delay, through the reference cell, which corrects for any drift caused by a change of selectively sorbed component content which would otherwise vary the elevated baseline as the sample composition varies, thus the zero or baseline is substantially controlled and needs only small periodic correction due to changing cell characteristics or temperature variations; automatic suppression of the potential analyzer response due to selectively sorbed material provides high sensitivity and accuracy even when the sample contains only a small proportion of less sorbed material since the peak may be selectively amplified as desired without interference by the continuous signal arising from continuous post-saturation elution of selectively sorbed material; the relatively short elution period permits a higher sampling frequency and therefore increased accuracy and reduced dead time; the use of a solid sorbent as the chromatograph column packing material eliminates problems of stability and substrate boil-away arising from conventional packings comprising an inert solid carrier coated with a high-boiling organic liquid substrate.

It is, therefore, one embodiment of this invention to provide an apparatus for the analysis of a multi-component fluid mixture comprising a separating column containing a solid sorbent (such as silica gel, activated charcoal, activated alumina, or molecular sieves) for selectively sorbing a component of said mixture, means for introducing a sample of said mixture and a carrier gas into said column, a measuring cell and a reference cell, conduit means connecting the outlet of the separating column to the inlet of the measuring cell, and delay line means connecting the outlet of the measuring cell to the inlet of the reference cell.

Another embodiment of the invention is directed to a method for analyzing a mixture of fluid components, at least one of which is selectively sorbed by contact with a solid sorbent and at least one other component is relatively less sorbed by the sorbent, which comprises pretreating a mass of said sorbent by contact with said selectively sorbed component until the sorbent is substantially saturated with respect to the selectively sorbed component; passing a sample of said mixture together with a carrier gas stream through a separation zone containing the pretreated sorbent; continuously eluting selectively sorbed component and discontinuously eluting less sorbed component from said zone; passing the effluent from said zone first through a measuring cell and then after a predetermined time delay to a reference cell to develop measuring and reference signals each responsive to concentration of selectively sorbed component alone when less sorbed component is absent from the respective cell and to total concentration of selectively sorbed component and less sorbed component when the latter is present in the respective cell, said time delay being of sufficient duration that the reference and measuring signals corresponding to less sorbed component are displaced in time.

A preferred solid sorbent is a material characterized as a dehydrated metal aluminosilicate hydrate wherein the metal constituent is an alkali or alkaline earth metal, also known as molecular sieves. These sorbents are particles having pore diameters in the range of 3 to 7 A. and are capable of selectively sorbing a variety of materials depending upon the specific pore diameter range and size distribution. The molecular sieves may be prepared by coprecipitating or otherwise combining alumina, silica and a metal oxide such as an oxide or hydroxide derivative of an alkali metal such as sodium, lithium or potassium or of an alkaline earth metal, such as calcium, magnesium, barium or strontium to form a uniform and intimately dispersed mixture of silica, alumina and the metal oxide or hydroxide, removing excess water from the mixed oxides and thereafter heating the recovered dispersed mixture to a temperature at which the water of hydration will be driven off by evaporation from the particles. The resulting dehydrated mixed oxides are preferably calcined at a temperature of from 400° to 800° F. to improve rigidity and strengthen the particles. Methods for the preparation of molecular sieves are well documented in the literature, as set forth, for example, in U.S. Patents 2,882,244 and 2,882,243.

One specific embodiment of the invention, using molecular sieves as the chromatographic column packing material, provides a method for the chromatographic analysis of the total non-normal hydrocarbon content in a mixture of fluid hydrocarbons comprising at least one normal aliphatic hydrocarbon and at least one non-normal hydrocarbon selected from the group consisting of branched chain and cyclic hydrocarbons. The normal aliphatic hydrocarbon is selectively sorbed by the molecular sieves and, after saturation of the sieves therewith, elutes continously from the column. The non-normal hydrocarbon is passed by the sieves and elutes as a compact band soon after sample injection. The normal aliphatic hydrocarbon may be saturated or unsaturated, e.g., a normal paraffin, or a straight chain olefin, diolefin or polyolefin, and may contain from 1 to about 22 carbon atoms. The non-normal hydrocarbon may be a branched chain paraffin, olefin, diolefin or polyolefin containing from 4 to about 22 carbon atoms, a cycloparaffin or cycloolefin containing from 4 to about 22 carbon atoms, or a mononuclear or polynuclear aromatic hydrocarbon containing from about 6 to about 22 carbon atoms. Since the components undergoing chromatographic separation are in the vapor state, hydrocarbons containing more than 22 carbon atoms cannot generally be analyzed by this method because they are too difficultly vaporizable, even with the substantial reduction of hydrocarbon partial pressure afforded by excess amounts of carrier gas, and tend instead to thermally decompose and deposit coke upon the column packing. When the normal aliphatic hydrocarbon is a normal paraffin it may therefore contain from 1 to 22 carbon atoms, and preferably is one containing from 4 to 18 carbon atoms. The non-normal hydrocarbon may contain from 4 to about 22 carbon atoms, and preferably is one containing from 4 to 18 carbon atoms. The "lumping effect" is most readily achieved when the carbon number spread of the analysis mixture does not exceed about 6 to 8 carbon numbers.

This invention is especially well suited to analyzing kerosene fractions comprising one or more normal paraffins containing from 10 to 16 carbon atoms, and one or more non-normal hydrocarbons containing from 6 to 16 carbon atoms. For an analysis mixture of this type the temperature of the molecular sieve column should be at least 600° F. and preferably somewhat higher, for example, in the range of 610°–650° F., in order to obtain continuous non-discriminatory elution of the normal paraffins, on the one hand, and non-discriminatory lumped elution of the non-normal hydrocarbons on the other. Below about 600° F. some separation of the $C_{10}$–$C_{16}$ fraction will begin. One typical analysis mixture may comprise a major proportion of normal paraffins and a minor proportion of non-normal hydrocarbons; another typical analysis mixture may comprise a major proportion of non-normals and a minor proportion of normals. In either case the reference signal due to normals plus carrier gas cancels the measuring signal due to normals plus carrier gas, leaving as the net analyzer response the peaks corresponding to non-normals.

Another specific embodiment of the invention, using molecular sieves as the column packing material, provides a method for the analysis of one or more less sorbed components selected from the group consisting of methane, ethane, propane, isobutane, hexane, oxygen, hydrogen, nitrogen, air and natural gas, in admixture with water which is selectively sorbed. The less sorbed components are passed by the sieves and elute from the column as a compact band soon after sample injection to develop twin opposite polarity peaks, the height of either peak being proportional to the total less sorbed component content of the sample. The water vapor is selectively sorbed by the sieves; thus, before saturation the reference gas is carrier gas and after saturation it is a mixture of carrier gas and water vapor. Those portions of the measuring and reference signals responsive to carrier gas before saturation, or to carrier gas plus water vapor after saturation, mutually cancel in the comparison circuit, leaving as the net analyzer response the less sorbed component peaks.

Another specific embodiment of the invention, using molecular sieves as the column packing material, provides a method for the analysis of one or more less sorbed components selected from the group consisting of methane, ethane, propane, normal butane, isobutane, normal pentane, isopentanes, normal hexane, normal heptane, normal octane, hydrogen, carbon dioxide and natural gas, in admixture with hydrogen sulfide and/or mercaptans, the latter sulfur compounds being selectively sorbed. The less sorbed components are passed by the sieves and elute from the column as a compact band soon after sample injection to develop twin opposite polarity peaks, the height of either peak being proportional to the total less sorbed component content of the sample. The sulfur compounds are selectively sorbed by the sives; before saturation the reference gas is carrier gas and after saturation it is a mixture of carrier gas and hydrogen sulfide and/or mercaptans. Those portions of the measuring and reference signals responsive to carrier gas before saturation, or to carrier gas plus sulfur compounds after saturation, mutually cancel in the comparison circuit, leaving as the net analyzer response the less sorbed component peaks.

Another specific embodiment of the invention, using molecular sieves as the column packing material, provides a method for the analysis of one or more less sorbed components selected from the group consisting of methane, ethane, ethylene, propane, butane, pentane, hydrogen, nitrogen and carbon monoxide, in admixture with carbon dioxide which is selectively sorbed. The less sorbed components are passed by the sieves and elute from the column as a compact band soon after sample injection to develop twin opposite polarity peaks, the height of either peak being proportional to the total less sorbed component content of the sample. The carbon dioxide is selectively sorbed by the sieves; before saturation the reference gas is carrier gas and after saturation it is a mixture of carrier gas and carbon dioxide. Those portions of the measuring and reference signals responsive to carrier gas before saturation, or to carrier gas plus carbon dioxide after saturation, mutually cancel in the comparison circuit, leaving as the net analyzer response the less sorbed component peaks.

Still another specific embodiment of the invention, using molecular sieves as the column packing material, provides a method for the analysis of one or more less sorbed components selected from the group consisting of methane, ethane, oxygen, hydrogen and nitrogen, in admixture with one or more normal unsaturated $C_1$–$C_3$ aliphatic hydrocarbons, said $C_1$–$C_3$ aliphatic hydrocarbons being selectively sorbed. The less sorbed components are passed by the sieves and elute from the column as a compact band soon after sample injection to develop twin opposite polarity peaks, the height of either peak being proportional to the total less sorbed component content of the sample. The unsaturated $C_1$–$C_3$ hydrocarbons are selectively sorbed by the sieves; before saturation the reference gas is carrier gas and after saturation it is a mixture of carrier gas and unsaturated $C_1$–$C_3$ aliphatic hydrocarbons. Those portions of the measuring and reference signals responsive to carrier gas before saturation, or to carrier gas plus unsaturated $C_1$–$C_3$ aliphatic hydrocarbons after saturation, mutually cancel in the comparison circuit, leaving as the net analyzer response the less sorbed component peaks.

Still another specific embodiment of the invention, using molecular sieves as the column packing material, provides a method for the analysis of one or more less sorbed components selected from the group consisting of methane, ethane and propane, in admixture with isobutane which is selectively sorbed. The less sorbed components are passed by the sieves and elute from the column as a compact band soon after sample injection to develop twin opposite polarity peaks, the height of either peak being proportional to the total less sorbed component content of the sample. The isobutane is selectively sorbed by the sieves; before saturation the reference gas is carrier gas and after saturation it is a mixture of carrier gas and isobutane. Those portions of the measuring and reference signals responsive to carrier gas before saturation, or to carrier gas plus isobutane after saturation, mutually cancel in the comparison circuit, leaving as the net analyzer response the less sorbed component peaks.

A still further specific embodiment of the invention, using molecular sieves as the column packing material, provides a method for the analysis of polynuclear aromatic hydrocarbons in a mixture of such polynuclear aromatic hydrocarbons with mononuclear aromatic hydrocarbons. The mononuclear aromatics are selectively sorbed and the polynuclear aromatics are relatively less sorbed. The less sorbed components are passed by the sieves and elute from the column as a compact band soon after sample injection to develop twin opposite polarity peaks, the height of either peak being proportional to the total polynuclear aromatic content of the sample. The mononuclear aromatics are selectively sorbed by the sieves; before saturation the reference gas is carrier gas and after saturation it is a mixture of carrier gas and mononuclear aromatics. Those portions of the measuring and reference signals responsive to carrier gas before saturation, or to carrier gas plus mononuclear aromatics after saturation, mutually cancel in the comparison circuit, leaving as the net analyzer response the polynuclear aromatic peaks.

Still another specific embodiment of the invention, using as the column packing material a solid adsorbent such as dehydrated silica gel, activated charcoal, activated alumina, etc., furnishes a method for the determination of paraffins in a mixture of olefins and paraffins. The olefins are selectively adsorbed and the paraffins are relatively less adsorbed. The paraffins are passed by the adsorbent and elute from the column as a compact band soon after sample injection to develop twin opposite polarity peaks, the height of either peak being proportional to the total paraffin content of the sample. The olefins are selectively adsorbed by the adsorbent; before saturation the reference gas is carrier gas and after saturation it is a mixture of carrier gas and olefins. Those portions of the measuring and reference signals responsive to carrier gas before saturation, or to carrier gas plus olefins atfer saturation, mutually cancel in the comparison circuit, leaving as the net analyzer response the paraffin peaks.

Still another specific embodiment of the invention, using as the column packing material a solid adsorbent such as dehydrated silica gel, activated charcoal, activated alumina, etc., provides a method for the determination of non-aromatic hydrocarbons in a mixture of aromatic hydrocarbons and non-aromatic hydrocarbons. The aromatic hydrocarbons are selectively adsorbed and the non-aromatic hydrocarbons are relatively less adsorbed. The non-aromatics are passed by the adsorbent and elute from the column as a compact band soon after sample injection to develop twin opposite polarity peaks, the height of either peak being proportional to the total non-aromatic content of the sample. The aromatic hydrocarbons are selectively adsorbed by the adsorbent; before saturation the reference gas is carrier gas and after saturation it is a mixture of carrier gas and aromatics. Those portions of the measuring and reference signals responsive to carrier gas before saturation, or to carrier gas plus aromatics after saturation, mutually cancel in the comparison circuit, leaving as the net analyzer response the non-aromatic hydrocarbon peaks.

The invention is specifically described in connection with the accompanying drawings of which.

Figure 1:
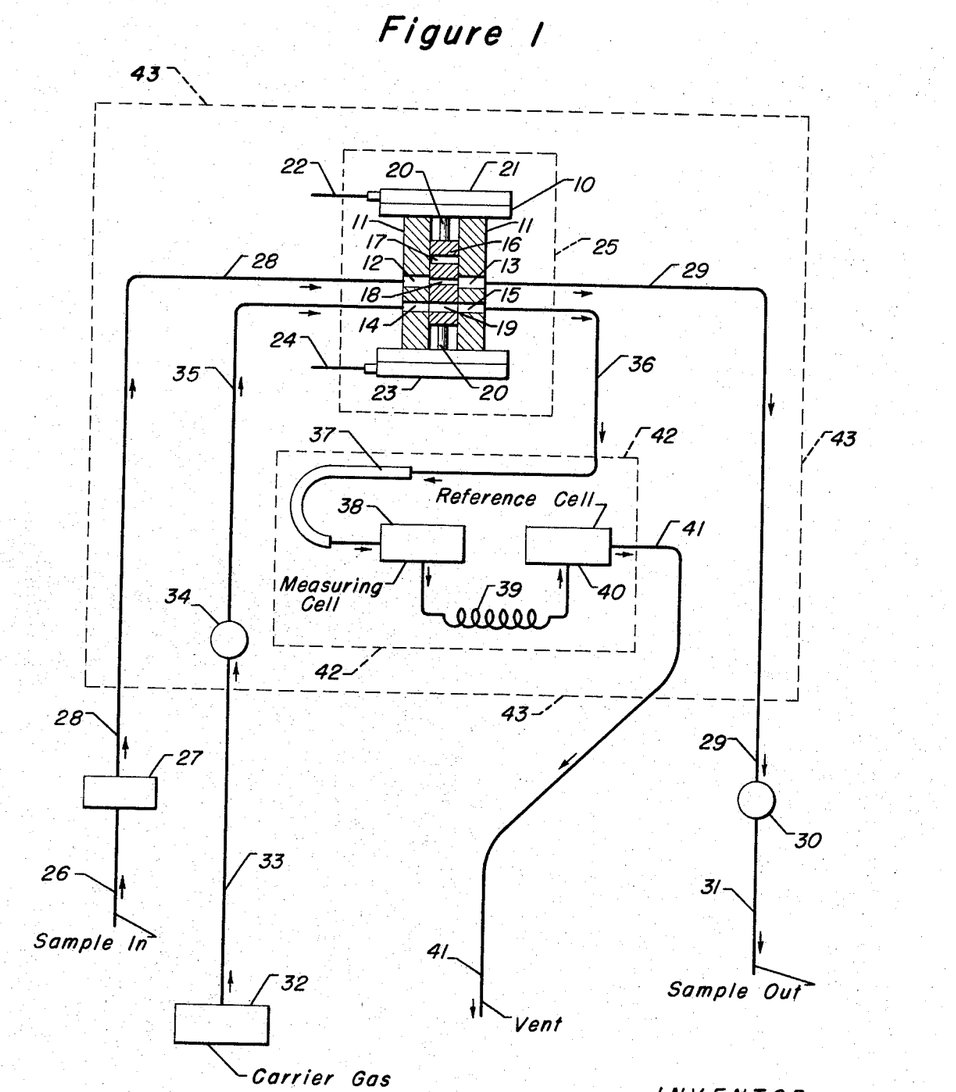
FIGURE 1 is a schematic diagram of a process stream analyzer embodying the invention.

With reference to FIGURE 1, there is shown in partial section a linear sample valve 10 which comprises outer stator plates 11 and an inner reciprocable plug 16 in fluid-tight contact with plates 11. Stator 11 is provided with ports 12, 13, 14 and 15. Plug 16 is provided with three transverse ports 17, 18 and 19; intermediate port 18 is of somewhat smaller diameter and is the sample or metering port. Plug 16 is driven to either of its two adjusted positions by means of a shaft 20 which is connected to an upper diaphragm operator 21 and also to a lower diaphragm operator 23. Actuating air is alternately supplied (through suitable automatically programmed valving, not shown) through line 22 to operator 21 or through line 24 to operator 23; when one of lines 22 and 24 is under pressure, the other line is simultaneously vented. With operator 23 pressured, plug 16 is moved upwardly into the position shown which is the "sample port refill" position: ports 12, 18 and 13 are in serial fluid communication, ports 14, 19 and 15 are in serial fluid communication, and port 17 is inoperative. With operator 21 pressured, plug 16 is moved downwardly into the "sample injection" position: ports 12, 17 and 13 are now in serial fluid communication, ports 14, 18 and 15 are in serial fluid communication, and port 19 is inoperative. Sample valve 10 is enclosed by an electrically heated, thermostatically controlled jacket 25 which maintains the valve at an elevated temperature sufficient to preheat, partially vaporized or completely vaporized the sample, as described. A circulating sample stream of the process fluid to be analyzed is introduced through inlet line 26, filter 27 and line 28 to valve 10; it passes through either port 18 or port 17 and is withdrawn through line 29, flow controller 30 and line 31, from which it may conveniently be returned to a point in the process under lower pressure than the inlet. The volume and length of tubing runs of the sample loop should be kept as small as practicable to minimize transport lag. A source of carrier gas 32 is connected to the analyzer by line 33. The carrier gas is preferably helium, but may also be neon, argon, hydrogen, nitrogen, $CO_2$ or other inert gas differing substantially in thermal characteristics from the components of interest in the sample stream. From line 33 the carrier gas is taken through a flow controller 34 and line 35 to valve 10; it passes through either port 18 or port 19 and then through line 36 to separating column 37 which contains a suitable solid sorbent. The outlet of column 37 is connected to the inlet of measuring thermal conductivity cell 38, and the outlet of cell 38 is coupled to the inlet of reference thermal conductivity cell 40 through a delay line or column 39. Delay line 39 may be a straight length of tubing, a capillary helix or spiral, a column filled with an inert fluid-pervious solid, or the like. Delay line 39 is sized to provide a sufficient fluid transport time therethrough that the less sorbed component peak generated by cell 38 has returned substantially to electrical zero before the less sorbed component peak generated by cell 40 commences. The magnitude of this time delay will depend on several variables such as type of sorbent, sample composition, carrier gas flow, column temperature, and also on whether or not the less sorbed components are eluted separately or simultaneously. In general a time delay of 0.5–60 seconds will be adequate, and preferably it will lie in the range of 0.5–30 seconds. Too long a time delay will unduly lengthen the analysis time per sample. Vapor effluent from cell 40 is vented through line 41. It will be appreciated that other types of detection devices may be substituted for the thermal conductivity cell, for example, this may be an ionization detector or a beta ray detector. Cells 38 and 40, separating column 37 and delay line 39 are encased in an electrically heated, thermostatically controlled detector block 42 which holds the column at a temperature sufficiently high to vaporize all of the components of the sample and where the sample mixture contains more than one selectively sorbed component or more than one less sorbed component, sufficiently high to prevent any appreciable separation as between the selectively sorbed components and, preferably, also as between the less sorbed components. The sample valve, detector block and carrier gas flow controller are mounted in a temperature controlled housing 43 adapted to provide an interior temperature in the range of 60°–120° F.

When valve 10 is in the "sample port refill" position, process fluid entering lines 26 and 28 flows through port 18 and is returned through lines 29 and 31 to the process or to a suitable sump or drain. Carrier gas is admitted through lines 33 and 35 to valve 10, passes through port 19, line 36, separating column 37, measuring cell 38, delay line 39, reference cell 40, and vent line 41. When valve 10 is in the "sample injection" position, plug port 18 is moved down to register with stator ports 14 and 15 and the sample trapped therein is swept out by the carrier gas into column 37 and thence to measuring cell 38, delay line 39 and reference cell 40. Plug port 17 moves down into registry with stator ports 12 and 13 to provide continuity of sample loop flow during the sample injection portion of the operating cycle. Frequency of sample injection may be varied from as much as 10 times per minute to once every ten minutes depending on the mixture to be analyzed, type of sorbent, length of column, column temperature, etc. Response time of the analyzer itself can frequently be made less than about 5 seconds after the sample is injected. One sample injection every 1–2 minutes is usually quite adequate for process monitoring and control applications and is preferred to allow time for operation of auxiliary apparatus such as a peak picker or bridge zeroing servo.

Figure 2:
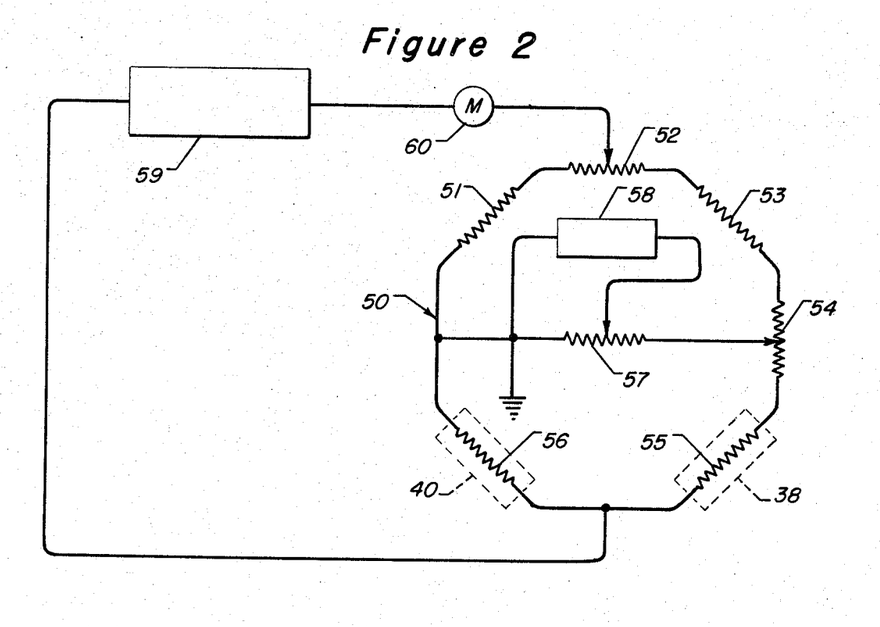
FIGURE 2 is a schematic diagram of a bridge circuit for deriving an output signal from the apparatus of FIGURE 1.

In FIGURE 2 there is illustrated a suitable two-element bridge circuit 50 for obtaining an output signal. One side of the bridge contains a fixed resistor 51 connected in series with a temperature sensitive resistive filament 56 within reference cell 40. The other side of the bridge contains the series combination of potentiometer 52 (coarse zero adjustment), fixed resistor 53, potentiometer 54 (fine zero adjustment) and a temperature sensitive resistive filament 55 within measuring cell 38. Both sides of bridge 50 are connected through a voltage divider 57 (attenuation adjustment) across which is connected a potentiometric recorder 58. Recorder 58 may be provided with mechanical or electronic peak picking means and pen lifting means whereby the data is displayed as a series of dots or lines rather than as a train of peaks. A constant current source 59 supplies regulated current to bridge 50 through a milliammeter 60. Obviously there are many other functionally equivalent circuits which could be used; for example, a four-element bridge would increase the sensitivity two-fold.

As an example of the operation and response of the invention, apparatus of the above-described construction may be employed to analyze a hydrocarbon stream consisting of about 60±5% by weight of $C_{10}$–$C_{16}$ normal paraffins and about 40±5% by weight of $C_6$–$C_{16}$ non-normal hydrocarbons (branched chain alkanes, aromatics and naphthenes). The separating column is 5 inches in length x 0.25 inch in diameter and contains about 1.9 grams of molecular sieves (a dehydrated calcium aluminosilicate hydrate having a pore diameter of about 5 A.). The volume of the sample injection port of the linear sample valve is 3 microliters. Operating conditions are established as follows:

| | |
|---|---|
| Sample valve temperature | 320°–330° F. |
| Detector block temperature | 625°–635° F. |
| Carrier gas (helium) flow | 100 cc./min.@750 mm. Hg. |
| Sample flow | 100 cc./min. |
| Frequency of sample injection | Once every 60 seconds. |
| Elution time: | |
|   Non-normals | 4.5 seconds. |
|   Normal paraffins | Infinite before saturation, continuous after saturation. |
| Delay time | 5 seconds. |

Figure 3:
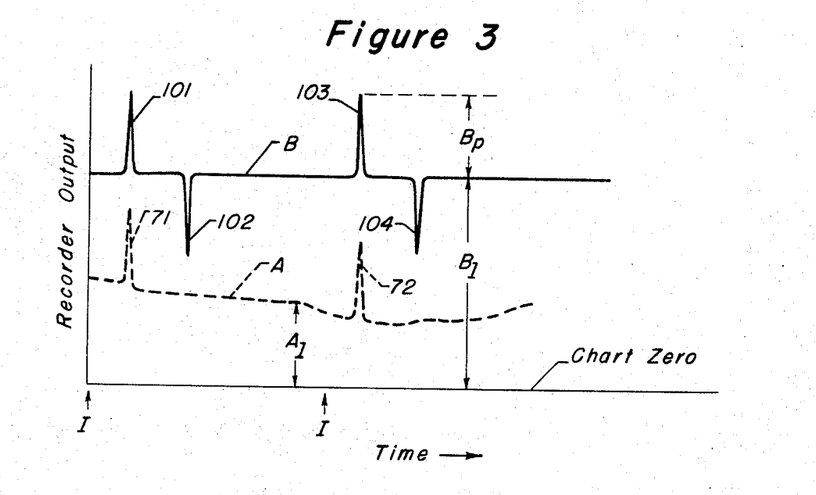
FIGURE 3 is a plot of a typical output signal developed by the method and apparatus of this invention, including a comparison between the response obtained from an analyzer employing automatic baseline compensation and the response obtained from an analyzer which does not employ automatic baseline compensation.

The response of the analyzer is shown in FIGURE 3 in which recorder output is plotted as a function of time for two different cases. Dashed curve A is the response of an analyzer the reference cell of which is connected to the helium carrier gas supply, does not therefore provide baseline compensation, and is not in accordance with this invention. Solid curve B is the response of the analyzer of this invention incorporating continuous automatic baseline compensation. The separating columns of both analyzers have previously been saturated with $C_{10}$–$C_{16}$ normal paraffins. The abscissa represents chart zero. The arrows marked I indicate successive sample injections.

Peaks 71 and 72 of curve A are developed by the discontinuous lumped elution of the non-normal hydrocarbons and are linearly superimposed on an elevated baseline which in turn is displaced above chart zero by a distance $A_1$. This elevated baseline is developed by the continuous non-discriminatory elution of the normal paraffins. Distance $A_1$ is not constant but varies with time reflecting changing normal paraffin content in successive samples. Therefore, although the height of peaks 71 and 72 above the elevated baseline is proportional to the total non-normal content of the sampled stream, the absolute height of peaks 71 and 72 above the abscissa or chart zero is not necessarily proportional to the total non-normal content of the sample stream. To obtain a correct measurement of non-normals it is necessary to subtract from the maximum peak deviation the instantaneous $A_1$ value measured at the same time.

Peaks 101, 102, 103 and 104 of curve B are also developed by the discontinuous lumped elution of the non-normal hydrocarbons and are linearly superimposed on an elevated baseline which in turn is displaced above chart zero by distance $B_1$. This elevated baseline bears no particular relation to normal paraffin content, but is due solely to the chosen bridge parameters which are adjusted to provide an electrical zero which is positive with respect to chart zero in order to display negative peaks as well as positive peaks. Peaks 101 and 103 are positive and correspond to passage of the non-normals through measuring cell 38; peaks 102 and 104 are negative and correspond to passage of the non-normals through reference cell 40. Distance $B_1$ is substantially constant with time, the effect of changing normal paraffin content being canceled out. The only variation in $B_1$ will be the very slow small magnitude drift arising from changing detector characteristics or temperature variations, which can easily be corrected for by periodic manual or automatic bridge zeroing means. The height of peak 103, for example, indicated by distance $B_p$, is proportional to the total non-normal hydrocarbon content of the last previous sample. Since $B_1$ is constant the absolute height of peak 103 above chart zero is also proportional to the non-normal content. If desired, $B_1$ may be reduced to zero by adjusting the bridge zeroing resistors so that only positive peaks will be displayed.

Mixtures other than hydrocarbons, such as those set forth above, may be analyzed in similar fashion. In all cases continuous automatic baseline compensation is obtained by passing the separating column effluent first through a measuring cell and then after a suitable time delay to a reference cell to develop measuring and reference signals which are compared by an appropriate comparison circuit. Where the analysis mixture comprises more than one selectively sorbed component, the temperature of the separating column is sufficiently elevated so that little or no separation of the selectively sorbed components will occur. And in a preferred embodiment of the invention, where the analysis mixture comprises more than one less sorbed component, the temperature of the separating column is held sufficiently high so that no significant separation of the less sorbed components will occur and these are therefore lumped together in a single peak which elutes soon after sample injection. In this manner a unitary signal is developed a magnitude of which is proportional to the weight concentration of all the less sorbed components. The elution time per sample is markedly reduced over that provided by conventional chromatographic analyzers, therefore permitting a higher sampling frequency, increased accuracy and reduced dead time. The invention also permits a very high order of accuracy and sensitivity because, with suppression of the selectively sorbed component signal, the discontinuous less sorbed component signals may be selectively amplified to any desired level without regard to the actual concentration of the selectively sorbed component.

I claim as my invention:

1. Apparatus for the analysis of a multi-component fluid mixture comprising a separating column containing a solid sorbent for selectively sorbing a component of said mixture, means for introducing a sample of said mixture and a carrier gas into said column, a measuring cell and a reference cell, conduit means connecting the outlet of said column to the inlet of said measuring cell, delay line means connecting the outlet of the measuring cell to the inlet of said reference cell, and means to detect the difference between the outputs of said measuring and reference cells.

2. The apparatus of claim 1 further characterized in that said sorbent is silica gel.

3. The apparatus of claim 1 further characterized in that said sorbent is activated charcoal.

4. The apparatus of claim 1 further characterized in that said sorbent is activated alumina.

5. The apparatus of claim 1 further characterized in that said sorbent is a dehydrated metal aluminosilicate hydrate.

6. Apparatus for the analysis of a multi-component fluid stream comprising a separating column containing a solid sorbent for selectively sorbing a component of said stream, means for passing a stream of carrier gas into said column, means for periodically introducing constant volume samples of said multi-component stream into the carrier gas stream at a point upstream from the column, a measuring cell and a reference cell, conduit means connecting the outlet of said column to the inlet of said measuring cell, delay line means connecting the outlet of the measuring cell to the inlet of said reference cell, and means to detect the difference between the outputs of said measuring and reference cells.

7. Apparatus for the analysis of a multi-component fluid stream comprising a separating column containing a solid sorbent consisting of a dehydrated metal aluminosilicate hydrate for selectively sorbing a component of said stream, means for passing a stream of carrier gas into said column, sample valve means for periodically introducing constant volume samples of said multi-component stream into the carrier gas stream at a point upstream from the column, a measuring cell and a reference cell, conduit means connecting the outlet of said column to the inlet of said measuring cell, delay line means connecting the outlet of the measuring cell to the inlet of said reference cell, and means to detect the difference between the outputs of said measuring and reference cells.

8. The apparatus of claim 7 further characterized in the provision of thermostatically controlled heating means for maintaining the separating column, measuring cell, delay line means, and reference cell at an elevated temperature.

9. The apparatus of claim 7 further characterized in the provision of thermostatically controlled heating means for maintaining the sample valve means at an elevated temperature.

10. The apparatus of claim 7 further characterized in that said delay line means is proportioned to provide a fluid transport time therethrough in the range of 0.5–30 seconds.

11. A method for analyzing a mixture of fluid components, at least one of which is selectively sorbed by contact with a solid sorbent and at least one other component is relatively less sorbed by the sorbent, which comprises pretreating a mass of said sorbent by contact with said selectively sorbed component until the sorbent is substantially saturated with respect to the selectively sorbed component; passing a sample of said mixture together with a carrier gas stream through a separation zone containing the pretreated sorbent; continuously eluting selectively sorbed component and discontinuously eluting less sorbed component from said zone; passing the effluent from said zone first through a measuring cell and then after a predetermined time delay to a reference cell to develop measuring and reference signals each responsive to concentration of selectively sorbed component alone when less sorbed component is absent from the respective cell and to total concentration of selectively sorbed component and less sorbed component when the latter is present in the respective cell, said time delay being of sufficient duration that the reference and measuring signals corresponding to less sorbed component are displaced in time.

12. A method for analyzing a mixture of fluid compounds, at least one of which is selectively sorbed by contact with a solid sorbent consisting of a dehydrated metal aluminosilicate hydrate and at least one other compound is relatively less sorbed by the sorbent, which comprises pretreating a mass of said sorbent by contact with said selectively sorbed compound until the sorbent is substantially saturated with respect to the selectively sorbed compound; passing a carrier gas stream through a separation zone containing the pretreated sorbent; introducing samples of said mixture at periodic intervals into the carrier gas stream at a point upstream from the separation zone; continuously eluting selectively sorbed compound and discontinuously eluting less sorbed compound from said zone; passing the effluent from said zone first through a measuring cell and then after a predetermined time delay to a reference cell to develop measuring and reference signals each responsive to concentration of selectively sorbed compound alone when less sorbed compound is absent from the respective cell and to tatal concentration of selectively sorbed compound and less sorbed compound when the latter is present in the respective cell, said time delay being of sufficient duration that the reference and measuring signals corresponding to less sorbed compound are displaced in time.

13. The method of claim 12 wherein said selectively sorbed compound is a normal aliphatic hydrocarbon and said less sorbed compound is a non-normal hydrocarbon selected from the group consisting of branched and cyclic hydrocarbons.

14. The method of claim 12 wherein said selectively sorbed compound is a normal paraffin and said less sorbed compound is a non-normal hydrocarbon selected from the group consisting of branched chain and cyclic hydrocarbons.

15. The method of claim 14 wherein said normal paraffin contains from 1 to 22 carbon atoms and said non-normal hydrocarbon contains from 4 to 22 carbon atoms.

16. The method of claim 14 wherein said normal paraffin contains from 4 to 18 carbon atoms and said non-normal hydrocarbon contains from 4 to 18 carbon atoms.

17. The method of claim 14 wherein said normal paraffin contains from 10 to 16 carbon atoms and said non-normal hydrocarbon contains from 6 to 16 carbon atoms.

18. A method for the chromatographic analysis of the total non-normal hydrocarbon content in a mixture of fluid hydrocarbons containing from 4 to 18 carbon atoms, at least one of which is a normal aliphatic hydrocarbon selectively sorbed by contact with a solid sorbent consisting of a dehydrated metal aluminosilicate hydrate and at least two other hydrocarbons are non-normal hydrocarbons selected from the group consisting of branched chain and cyclic hydrocarbons which are relatively less sorbed by the sorbent, which method comprises pretreating a mass of said sorbent by contact with said normal aliphatic hydrocarbon until the sorbent is substantially saturated with respect to the normal aliphatic hydrocarbon; passing a carrier gas stream through a separation zone containing the pretreated sorbent; introducing samples of said mixture at periodic intervals into the carrier gas stream at a point upstream from the separation zone; continuously eluting said aliphatic hydrocarbon and discontinuously eluting said non-normal hydrocarbons from said zone, the temperature of said zone being sufficiently high that said hydrocarbons are maintained in the vapor phase therein and said non-normal hydrocarbons are eluted from the separation zone substantially simultaneously; passing the effluent from said zone first through a measuring cell and then after a predetermined time delay to a reference cell to develop measuring and reference signals each responsive to concentration of said aliphatic hydrocarbon alone when non-normal hydrocarbons are absent from the respective cell and to total concentration of said aliphatic hydrocarbon and said non-normal hydrocarbons when the latter are present in the respective cell, said time delay being of sufficient duration that the reference and measuring signals corresponding to said non-normal hydrocarbons are displaced in time.

19. A method for the chromatographic analysis of the total non-normal hydrocarbon content in a mixture of fluid hydrocarbons, at least one of which is a normal paraffin containing from 10 to 16 carbon atoms and is selectively sorbed by contact with a solid sorbent consisting of dehydrated metal aluminosilicate hydrate and at least two other hydrocarbons are non-normal hydrocarbons selected from the group consisting of branched chain and cyclic hydrocarbons containing from 6 to 16 carbon atoms and which are relatively less sorbed by the sorbent, which method comprises pretreating a mass of said sorbent by contact with said normal paraffin until the sorbent is substantially saturated with respect to the normal paraffin; passing a carrier gas stream through a separation zone containing the pretreated sorbent; introducing samples of said mixture at periodic intervals into the carrier gas stream at the point upstream from the separation zone; continuously eluting said normal paraffin and discontinuously eluting said non-normal hydrocarbons from said zone, the temperature of said zone being sufficiently high that the hydrocarbons are maintained in the vapor phase therein and said non-normal hydrocarbons are eluted from the separation zone substantially simultaneously; passing the effluent from said zone first through a measuring cell and then after a predetermined time delay to a reference cell to develop measuring and reference signals each responsive to concentration of said normal paraffin alone when said non-normal hydrocarbons are absent from the respective cell and to total concentration of said normal paraffin and said non-normal hydrocarbons when the latter are present in the respective cell, said time delay being of sufficient duration that the reference and measuring signals corresponding to said non-normal hydrocarbons are displaced in time.

20. The method of claim 19 wherein the temperature of the separation zone is above about 600° F.

References Cited

UNITED STATES PATENTS

| 2,985,007 | 5/1961 | Boeke | 73—23.1 |
| 3,263,488 | 8/1966 | Martin | 73—23.1 |

JAMES J. GILL, *Acting Primary Examiner.*

C. A. RUEHL, *Assistant Examiner.*